United States Patent
Yoo et al.

(10) Patent No.: US 10,420,090 B2
(45) Date of Patent: Sep. 17, 2019

(54) COMMUNICATION TECHNIQUE USING CSI-RS IN MOBILE COMMUNICATION SYSTEM

(71) Applicant: Samsung Electronics Co., Ltd., Suwon-si, Gyeonggi-do (KR)

(72) Inventors: Hyun-Il Yoo, Suwon-si (KR); Keon-Kook Lee, Suwon-si (KR); Tae-Young Kim, Seoul (KR); Jee-Hwan Noh, Suwon-si (KR); Su-Ryong Jeong, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/752,074

(22) PCT Filed: Aug. 8, 2016

(86) PCT No.: PCT/KR2016/008696
§ 371 (c)(1),
(2) Date: Feb. 12, 2018

(87) PCT Pub. No.: WO2017/026762
PCT Pub. Date: Feb. 16, 2017

(65) Prior Publication Data
US 2018/0242285 A1    Aug. 23, 2018

(30) Foreign Application Priority Data
Aug. 13, 2015    (KR) .................... 10-2015-0114573

(51) Int. Cl.
*H04W 72/04*    (2009.01)
*H04B 7/0456*    (2017.01)
(Continued)

(52) U.S. Cl.
CPC ........ *H04W 72/042* (2013.01); *H04B 7/0456* (2013.01); *H04B 7/0617* (2013.01);
(Continued)

(58) Field of Classification Search
CPC ... H04W 72/042; H04W 76/27; H04W 24/10; H04L 25/0226; H04L 5/0023;
(Continued)

(56) References Cited

U.S. PATENT DOCUMENTS

2014/0126476 A1*    5/2014    Kang ................... H04L 1/0026
                                                          370/328
2018/0076881 A1*    3/2018    Zhu ........................ H04B 7/204

FOREIGN PATENT DOCUMENTS

EP              2 869 478 A1      5/2015
KR     10-2016-0123873 A       10/2016
(Continued)

OTHER PUBLICATIONS

Huawei et al.; CSI enhancements for TDD eIMTA; 3GPP TSG RAN WG1 Meeting #74bis; R1-134048; Oct. 7-11, 2013; Guangzhou, China.
(Continued)

*Primary Examiner* — Dady Chery
(74) *Attorney, Agent, or Firm* — Jefferson IP Law, LLP

(57) ABSTRACT

Disclosed is a 5G or pre-5G communication system to be provided so as to support a data transmission rate higher than that of a 4G communication system, such as LTE. Disclosed is a communication method of a base station using a channel state information reference signal (CSI-RS) in a mobile communication system, the method comprising the steps of: receiving a sounding reference signal (SRS) from a terminal; selecting a precoding matrix by using the received SRS; transmitting a CSI-RS by using the selected precoding matrix; receiving a CSI report from the terminal, and deter-
(Continued)

mining a transmission parameter on the basis of the CSI report; and transmitting data to the terminal by applying the determined transmission parameter thereto, wherein the CSI-RS is aperiodically transmitted.

18 Claims, 12 Drawing Sheets

(51) Int. Cl.
    *H04B 7/06*     (2006.01)
    *H04L 5/00*     (2006.01)
    *H04L 23/00*     (2006.01)
    *H04W 76/27*     (2018.01)
    *H04W 24/10*     (2009.01)
    *H04L 25/02*     (2006.01)

(52) U.S. Cl.
    CPC ......... *H04B 7/0626* (2013.01); *H04L 5/0023* (2013.01); *H04L 5/0048* (2013.01); *H04L 5/0053* (2013.01); *H04L 5/0091* (2013.01); *H04L 23/00* (2013.01); *H04L 25/0226* (2013.01); *H04W 24/10* (2013.01); *H04W 76/27* (2018.02)

(58) Field of Classification Search
    CPC ..... H04L 5/0091; H04L 5/0053; H04L 23/00; H04L 5/0048; H04B 7/0626; H04B 7/0456; H04B 7/0617
    See application file for complete search history.

(56) References Cited

FOREIGN PATENT DOCUMENTS

| | | |
|---|---|---|
| WO | 2014/116928 A1 | 7/2014 |
| WO | 2015/048277 A1 | 4/2015 |

OTHER PUBLICATIONS

ZTE; Enhanced CSI Schemes for TDD EBF/FD-MIMO System; 3GPP TSG RAN WG1 Meeting #80bis; R1-151746; Apr. 20-24, 2015; Belgrade, Serbia.

NEC; Discussion on beamformed CSI-RS-based schemes; 3GPP TSG RAN WG1 Meeting #81; R1-152684; May 25-29, 2015; Fukuoka, Japan.

LG Electronics; Discussion on specification impacts for beamformed CSI-RS-based schemes; 3GPP TSG RAN WG1 Meeting #81; R1-152750; May 25-29, 2015; Fukuoka, Japan.

* cited by examiner

COMMUNICATION TECHNIQUE USING CSI-RS IN MOBILE COMMUNICATION SYSTEM

CROSS-REFERENCE TO RELATED APPLICATIONS

The present application claims priority under 35 U.S.C. § 365 to International Patent Application No. PCT/KR2016/008696 filed on Aug. 8, 2016, entitled "COMMUNICATION TECHNIQUE USING CSI-RS IN MOBILE COMMUNICATION SYSTEM", and to Korean Patent Application No. 10-2015-0114573 filed on Aug. 13, 2015, each of which are incorporated herein by reference into the present disclosure as if fully set forth herein.

FIELD

The present disclosure relates to a communication technique of a mobile communication system, and relates to a communication technique using a CSI-RS such as an FD-MIMO system.

BACKGROUND

In order to meet the demand for wireless data traffic which has increased since the commercialization of a fourth Generation (4G) communication system, efforts have been made to develop an improved fifth Generation (5G) communication system or a pre-5G communication system. For this reason, the 5G or pre-5G communication system is called a "beyond 4G network communication system" or a "post Long-Term Evolution (LTE) communication system".

In order to achieve a high data transfer rate, the 5G communication system is considered to be implemented in an ultra-high frequency (millimeter Wave (mmWave)) band (e.g., 60 GHz band). In order to reduce the path loss of radio waves and increase the transmission distance thereof in the mmWave band, techniques such as beamforming, massive Multiple-Input Multiple-Output (MIMO), Full-Dimensional MIMO (FD-MIMO), array antenna, analog beamforming, and large scale antenna, are under discussion in the 5G communication system.

Also, in order to improve a network of a system, the development of techniques, such as evolved small cell, advanced small cell, cloud Radio Access Network (cloud RAN), ultra-dense network, Device-to-Device (D2D) communication, wireless backhaul, moving network, cooperative communication, Coordinated Multi-Points (CoMP), and reception interference cancellation, has been conducted in the 5G communication system.

In addition, hybrid Frequency Shift Keying (FSK) and Quadrature Amplitude Modulation (QAM) modulation (FQAM) and Sliding Window Superposition Coding (SWSC), which are Advanced Coding Modulation (ACM) schemes; and Filter Bank Multi-Carrier (FBMC), Non-Orthogonal Multiple Access (NOMA), and Sparse Code Multiple Access (SCMA), which are advanced access techniques, have been developed in the 5G system.

In an LTE system, a base station may transmit a Reference Signal (RS) referred to as a "Channel State Information (CSI)-Reference Signal (RS)", and a user equipment may receive the CSI-RS and may calculate CSI, which is to be reported to the base station, by using the received CSI-RS.

FIG. 1 is a view for explaining a pattern of a CSI-RS defined in the LTE standards according to the number of ports.

(a) of FIG. 1 illustrates 20 CSI-RS patterns in a case where the number of CSI-RS ports is 2.

(b) of FIG. 1 illustrates 10 CSI-RS patterns in a case where the number of CSI-RS ports is 4.

(c) of FIG. 1 illustrates 5 CSI-RS patterns in a case where the number of CSI-RS ports is 8.

Table 1 below shows an example of CSI-RS configuration according to the number of CSI-RSs (i.e., the number of CSI-RS ports) which is configured.

TABLE 1

| CSI reference signal configuration | | Number of CSI reference signals configured | | | | | |
|---|---|---|---|---|---|---|---|
| | | 1 or 2 | | 4 | | 8 | |
| | | (k', l') | $n_s$ mod 2 | (k', l') | $n_s$ mod 2 | (k', l') | $n_s$ mod 2 |
| Frame structure type 1 and 2 | 0 | (9, 5) | 0 | (9, 5) | 0 | (9, 5) | 0 |
| | 1 | (11, 2) | 1 | (11, 2) | 1 | (11, 2) | 1 |
| | 2 | (9, 2) | 1 | (9, 2) | 1 | (9, 2) | 1 |
| | 3 | (7, 2) | 1 | (7, 2) | 1 | (7, 2) | 1 |
| | 4 | (9, 5) | 1 | (9, 5) | 1 | (9, 5) | 1 |
| | 5 | (8, 5) | 0 | (8, 5) | 0 | | |
| | 6 | (10, 2) | 1 | (10, 2) | 1 | | |
| | 7 | (8, 2) | 1 | (8, 2) | 1 | | |
| | 8 | (6, 2) | 1 | (6, 2) | 1 | | |
| | 9 | (8, 5) | 1 | (8, 5) | 1 | | |
| | 10 | (3, 5) | 0 | | | | |
| | 11 | (2, 5) | 0 | | | | |
| | 12 | (5, 2) | 1 | | | | |
| | 13 | (4, 2) | 1 | | | | |
| | 14 | (3, 2) | 1 | | | | |
| | 15 | (2, 2) | 1 | | | | |
| | 16 | (1, 2) | 1 | | | | |
| | 17 | (0, 2) | 1 | | | | |
| | 18 | (3, 5) | 1 | | | | |
| | 19 | (2, 5) | 1 | | | | |

With reference to FIG. 1 and Table 1, it can be noted that, when the number of CSI-RS ports is 1 (or 2), 4, and 8, there exist 20, 10, and 5 CSI-RS patterns (CSI-RS reuse patterns), respectively.

A CSI-RS reuse pattern is transmitted from a base station to a user equipment through a Radio Resource Control (RRC) message at long periods (e.g., a period of a few hundred milliseconds). By using the CSI-RS, the user equipment may estimate a Rank Indicator (RI), a Channel Quality Indicator (CQI), and a Precoding Matrix Indicator (PMI), and may feed back the estimated RI, CQI, and PMI to the base station.

Meanwhile, after Rel-13 of the LTE standard, according to the introduction of the concept of Full Dimension multiple-Input Multiple-Output (FD-MIMO) which considers the elevation angle of beamforming, the transmission of a BeamFormed CSI-RS (hereinafter, "BF-CSI-RS") has been considered.

SUMMARY

Technical Problem

The transmission of a BF-CSI-RS which is User Equipment (UE)-specifically performed in view of an elevation angle allows a UE to accurately estimate a downlink CSI between a base station and a UE, but in order to periodically transmit a UE-specific BF-CSI-RS to multiple UEs, large overhead inevitably occurs.

Accordingly, in order to support a UE-specific CSI-RS, there is a need for a more flexible subframe configuration technique as in the case of the transmission of an aperiodic CSI-RS or Semi-Persistent Scheduling (SPS)-based CSI-RS transmission.

In this regard, the present disclosure proposes an aperiodic CSI-RS transmission technique for reducing overhead which occurs during the transmission of a CSI-RS, and a technique for triggering such aperiodic CSI-RS transmission.

Also, the present disclosure proposes the transmission of an aperiodic BF-CSI-RS for a UE-specific BF-CSI-RS, and proposes various embodiments of triggering of the same.

Technical Solution

In accordance with an aspect of the present disclosure, a method of a base station for performing communication by using a channel state information reference signal (CSI-RS) in a mobile communication system is provided. The method includes: receiving a sounding reference signal (SRS) from a user equipment; selecting a precoding matrix by using the received SRS; transmitting a CSI-RS by using the selected precoding matrix; receiving channel state information (CSI) reporting from the user equipment, and determining a transmission parameter based on the CSI reporting; and applying the determined transmission parameter so as to transmit data to the user equipment, wherein the CSI-RS is aperiodic CSI-RS.

In accordance with another aspect of the present disclosure, a method of a user equipment for performing communication by using a channel state information reference signal (CSI-RS) in a mobile communication system is provided. The method includes: transmitting a sounding reference signal (SRS) to a base station; receiving a CSI-RS by using a precoding matrix selected by the base station; calculating CSI by using the received CSI-RS; transmitting, to the base station, CSI reporting including the calculated CSI; and receiving data from the base station, wherein the CSI-RS is aperiodic CSI-RS.

In accordance with still another aspect of the present disclosure, a base station using a channel state information reference signal (CSI-RS) in a mobile communication system is provided. The base station includes: a controller configured to receive a sounding reference signal (SRS) from a user equipment, select a precoding matrix by using the received SRS, transmit a CSI-RS by using the selected precoding matrix, receive channel state information (CSI) reporting from the user equipment, and determine a transmission parameter based on the CSI reporting, and apply the determined transmission parameter so as to transmit data to the user equipment; and a transceiver configured to transmit/receive the CSI-RS or the data under the control of the controller, wherein the CSI-RS is aperiodic CSI-RS.

In accordance with yet another aspect of the present disclosure, a user equipment using a channel state information reference signal (CSI-RS) in a mobile communication system is provided. The user equipment includes: a controller configured to transmit a sounding reference signal (SRS) to a base station, receive a CSI-RS by using a precoding matrix selected by the base station, calculate CSI by using the received CSI-RS; transmit, to the base station, CSI reporting including the calculated CSI, and receive data from the base station; and a transceiver configured to transmit/receive the CSI-RS, the CSI reporting, or the data under the control of the controller, wherein the CSI-RS is aperiodic CSI-RS.

Advantageous Effects

The present disclosure can prevent the occurrence of excessive overhead while a base station uses a UE-specific CSI-RS, and thus allows efficient use of RS resources.

The present disclosure allows the transmission of an aperiodic CSI-RS to be implemented in various schemes.

The present disclosure can prevent the occurrence of excessive overhead while a base station uses a UE-specific beamformed CSI-RS, and thus allows efficient use of RS resources.

The present disclosure allows the transmission of an aperiodic beamformed CSI-RS to be implemented in various schemes.

BRIEF DESCRIPTION OF DRAWINGS

The above and other aspects, features and advantages of the present disclosure will be more apparent from the following detailed description taken in conjunction with the accompanying drawings, in which.

DETAILED DESCRIPTION

Hereinafter, embodiments of the present disclosure will be described in detail with reference to the accompanying drawings. In the following description of embodiments of the present disclosure, when a detailed description of known functions and configurations incorporated herein is determined to unnecessarily obscure the subject matter of the present disclosure, the detailed description thereof will be omitted. Also, the terms described below are defined in view of the functions in the embodiments of the present disclosure, and meanings of the terms may change according to the intention of a user or operator, practice, or the like. Therefore, the definitions of the terms should be made based on the contents throughout the present specification.

Before the detailed description of embodiments of the present disclosure, an example of interpretable meanings of some terms used in the present specification will be proposed. However, it should be noted that the terms are not limited to the example of the interpretable meanings thereof which will be proposed below.

A base station is a subject that communicates with a user equipment, and may be referred to as "BS", "NodeB (NB)", "eNodeB (eNB)", "Access Point (AP)", or the like.

A user equipment is a subject that communicates with an eNB, and may be referred to as "UE", "Mobile Station (MS)", "Mobile Equipment (ME)", "device", "terminal", or the like.

In a Frequency Division Duplex (FDD), an eNB may generate a UE-specific BF-CSI-RS by estimating the characteristics of a statistical downlink channel having a long period by using a partial channel reciprocity, from channel feedback information or Sounding Reference Signal (SRS). In a Time Division Duplex (TDD), the eNB may generate a BF-CSI-RS through an SRS by using a channel reciprocity.

Figure 1:
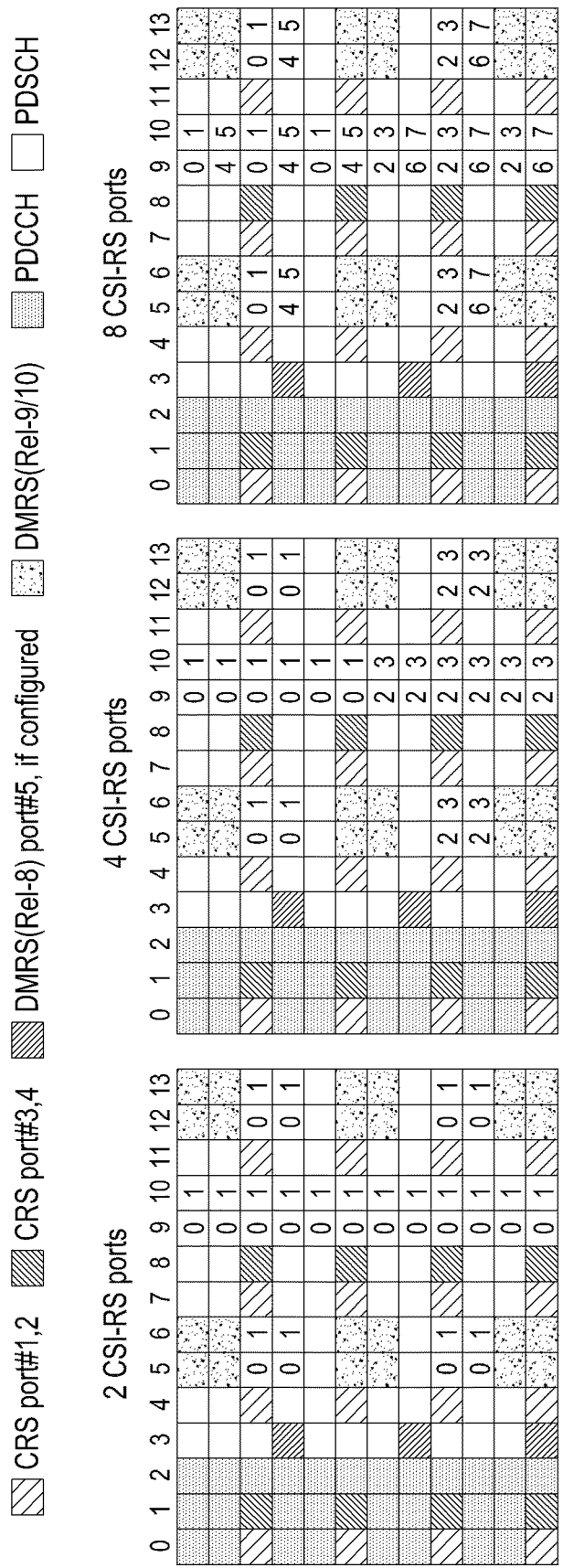
FIG. 1 is a view for explaining a pattern of a CSI-RS defined in the LTE standards according to the number of ports.
Figure 2:
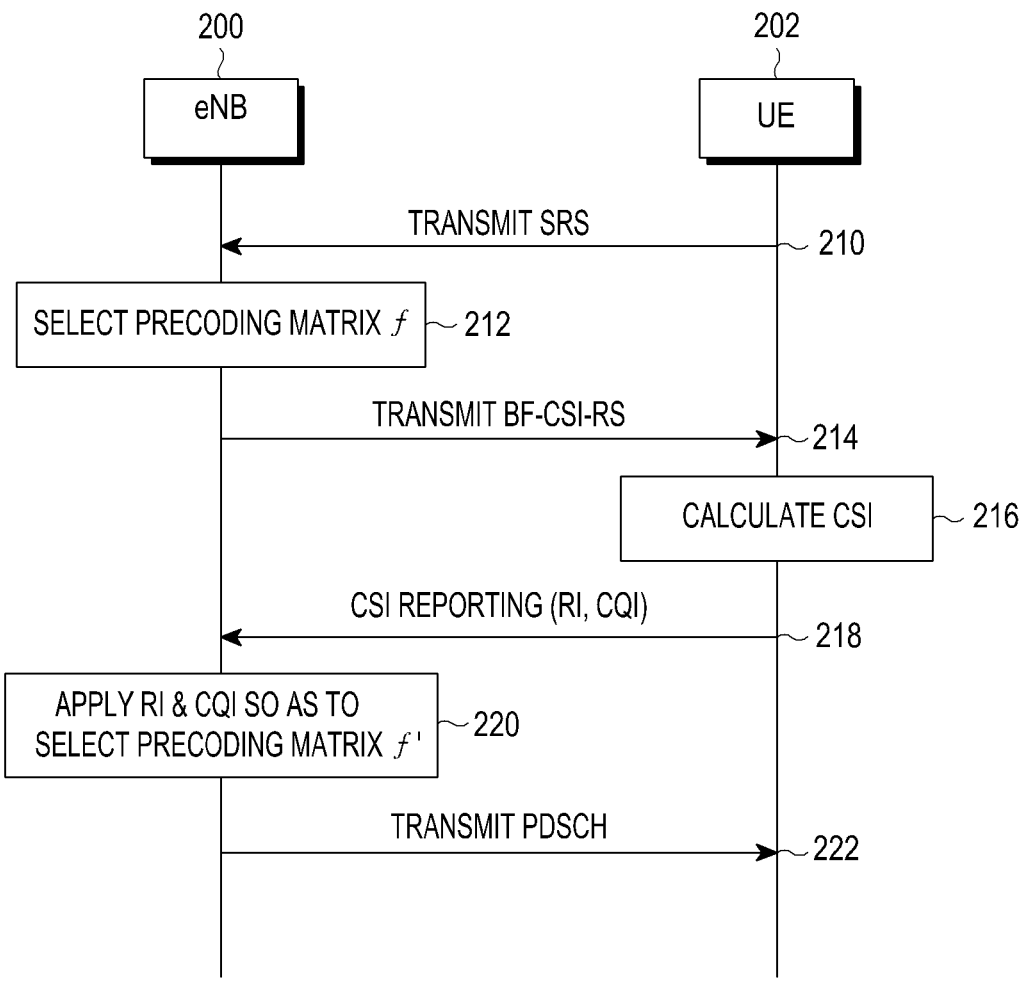
FIG. 2 is a diagram illustrating an example of a procedure for CSI feedback (i.e., CSI reporting) using a UE-specific BF-CSI-RS according to an embodiment of the present disclosure.

FIG. 2 is a diagram illustrating an example of a procedure for CSI feedback (i.e., CSI reporting) using a UE-specific BF-CSI-RS according to an embodiment of the present disclosure.

When a UE 202 transmits an SRS to an eNB 200 in operation 210, in operation 212, the eNB 200 selects a precoding matrix f appropriate for the UE 202 on the basis of the SRS. The precoding matrix may be UE-specific, and accordingly, may be used to transmit a UE-specific BF-CSI-RS. Also, the precoding matrix may be a vector, which belongs to a codebook predefined by quantizing a channel, or channel information.

In operation 214, the eNB 200 transmits a BF-CSI-RS by using the selected precoding matrix f. The BF-CSI-RS may be transmitted through one CSI-RS port or two CSI-RS ports, or may be transmitted through more than two CSI-RS ports (e.g., 4 or 8).

In operation 216, the UE 202 receives a BF-CSI-RS, and measures (or calculates) CSI by using the BF-CSI-RS.

In operation 218, the UE 202 reports the calculated CSI to the eNB 200. The CSI may include an RI or a CQI.

In operation 220, the eNB 200 applies the RI and the CQI by using the reported CSI so as to select a precoding matrix f' for transmitting a Physical Data Shared CHannel (PDSCH). The eNB 200 may selects the precoding matrix f in operation 212 as the precoding matrix f' without change, or may select, as the precoding matrix f', a matrix obtained by partially modifying the precoding matrix f in operation 212 by using the CSI reported in operation 218.

In operation 222, the eNB 200 may transmit a PDSCH to the UE 202 by using the RI, the CQI, and the selected precoding matrix f'.

The most significant advantage of a UE-specific BF-CSI-RS is to allow the UE to accurately estimate CSI by using the BF-CSI-RS. However, according to the circumstances, the eNB may support only transmission of a periodic CSI-RS which is not UE-specific.

Therefore, the present disclosure proposes the application of an aperiodic CSI-RS in order to reduce overhead caused by a UE-specific BF-CSI-RS.

Table 2 below shows an example of parameters configured by an RRC message in order to transmit a CSI-RS.

TABLE 2

```
CSI-RS-Config-r10 ::= SEQUENCE {
  csi-RS-r10      CHOICE {
    release       NULL,
    setup         SEQUENCE {
      antennaPortsCount-r10    ENUMERATED {an1, an2, an4, an8},
      resourceConfig-r10       INTEGER (0..31),
      subframeConfig-r10       INTEGER (0..154),
      p-C-r10       INTEGER (-8..15)
    }
  }              OPTIONAL,    -- Need ON
}
```

The parameters "resourceConfig-r10" and "subframeConfig" from among the parameters included in the RRC message shown in Table 2 notify of a subframe in which a CSI-RS configuration number and a CSI-RS shown in Table 1 are to be transmitted, respectively.

The RRC message shown in Table 2 may be used to configure the transmission of not only a periodic CSI-RS (P-CSI-RS) but also an aperiodic CSI-RS (Ap-CSI-RS).

Accordingly, the transmission of an Ap-CSI-RS by the eNB may be configured through the RRC message shown in Table 2, and the eNB may trigger, through a separate trigger signal, the transmission of an Ap-CSI-RS to the UE.

Figure 3:
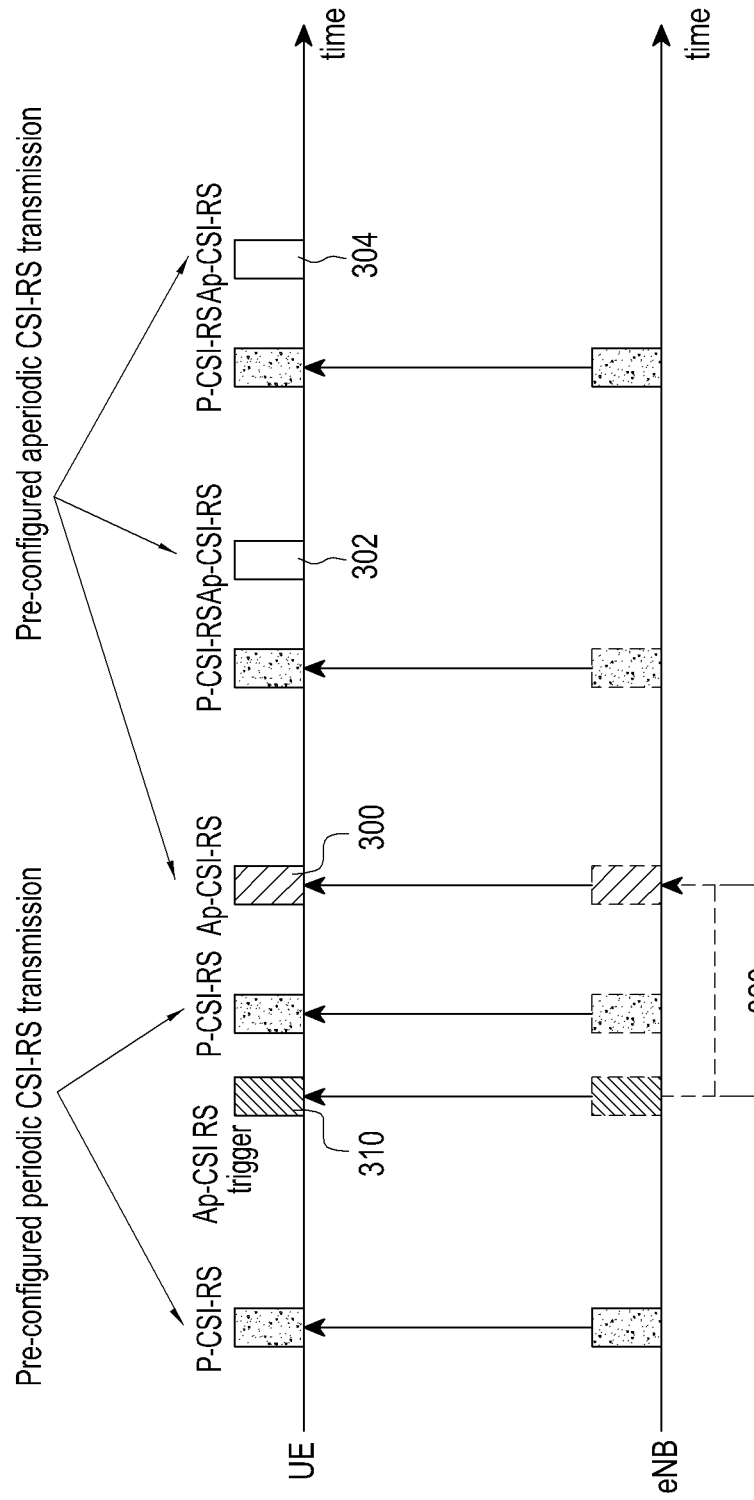
FIG. 3 is a diagram illustrating an example of a method for configuring transmission of an Ap-CSI-RS and triggering an Ap-CSI-RS by a base station.

FIG. 3 is a diagram illustrating an example of a method for configuring transmission of an Ap-CSI-RS and triggering an Ap-CSI-RS by an eNB.

As illustrated in FIG. 3, after subframes 300, 302, and 304 for transmitting an Ap-CSI-RS are pre-configured through an RRC message, an eNB may transmit an Ap-CSI-RS trigger signal 310 to a UE and may trigger (or notify of) the transmission of an Ap-CSI-RS. The eNB having transmitted the Ap-CSI-RS trigger signal 310 transmits an Ap-CSI-RS in the first subframe 300 after a predetermine time interval 320 for which the Ap-CSI-RS can be transmitted, and the UE having received the Ap-CSI-RS trigger signal 310 receives the Ap-CSI-RS transmitted by the eNB in the subframe 300.

The present disclosure will describe examples of three methods for Ap-CSI-RS transmission triggering. Specifically, the present disclosure will describe a method for explicitly transmitting a trigger for an Ap-CSI-RS to a UE by an eNB, and a method for implicitly indicating a trigger for an Ap-CSI-RS to a UE through an SRS request by an eNB.

A first explicit method for Ap-CSI-RS triggering uses an RRC message. The eNB may include trigger information of an Ap-CSI-RS in an existing RRC message and may transmit, to the UE, the RRC message including the trigger information thereof. Alternatively, the eNB may explicitly notify the UE of the transmission of an Ap-CSI-RS by using a new RRC message. However, since an RRC message has a period of a few hundred milliseconds, the delivery of trigger information through the RRC message may not appropriately support UE-specific Ap-CSI-RS transmission in the form of on-demand (immediately responding to a request).

A second explicit method for Ap-CSI-RS triggering uses Downlink Control Information (DCI). The eNB may newly define trigger information of an Ap-CSI-RS within a DCI format and may transmit, to the UE, the trigger information thereof newly defined within the DCI format. Alternatively, the eNB may explicitly notify the UE of trigger information of an Ap-CSI-RS by using a new DCI format.

Various embodiments of transmission of trigger information of an Ap-CSI-RS in a DCI format by an eNB will be described.

A first embodiment of a method for transmitting trigger information of an Ap-CSI-RS in a DCI format is a method using Uplink (UL) DCI (e.g., a DCI format 0 or 4). As an example, the eNB may use a field for aperiodic CSI reporting (Ap-CSI-rep) within the DCI format 0 or 4 to transmit the trigger information. Since the UE measures CSI by using an AP-CSI-RS and reports the measured CSI to the eNB, the eNB may trigger an Ap-CSI-RS by using an Ap-CSI-rep field within the UL DCI. As another example, the eNB may add a new field for a trigger to a reserved bit area within UL DCI, and may use the new field in such a manner as to transmit the trigger information through the new field.

A second embodiment of the method for transmitting a trigger for an Ap-CSI-RS in a DCI format is a method using Downlink (DL) DCI (e.g., a DCI format 1, 2, 2A, or the like). As an example, the eNB may define a new field for a trigger for an Ap-CSI-RS in the DCI format 1, 2, or 2A, and may load, into the defined new field, trigger information for transmitting an Ap-CSI-RS.

A third embodiment of the method for transmitting a trigger for an Ap-CSI-RS in a DCI format is a method for loading, together into the DCI format, fields for trigger information and RS transmission resource information for transmitting an Ap-CSI-RS. The present embodiment allows the eNB to transmit the RS transmission resource information to the UE, and thus allow the management of RS transmission resources to be more flexible than the second embodiment. A DCI format, in which the trigger information and Ap-CSI-RS transmission resource information are transmitted, may be a DCI format 1, 2, or the like. The RS transmission resource information may include at least one piece of information among RS resource information (the number of ports, subframe, the number of transmissions, and Resource Element (RE) position) and resource assignment information.

A fourth embodiment of the method for transmitting a trigger for an Ap-CSI-RS in a DCI format is a method for defining a new DCI format for transmitting trigger information. A new DCI format or a modified DCI format for the same may include at least one of a trigger field, a RS resource information (the number of ports, subframe, the number of transmissions, and RE position) field, and a resource assignment information field.

Meanwhile, as described above, a new field added to a DCI format in order to trigger an Ap-CSI-RS may be extended to the use of triggering Ap-CSI-rep described below as well as an Ap-CSI-RS.

A third implicit method for Ap-CSI-RS triggering is a method for allowing a UE to implicitly know Ap-CSI-RS transmission instead of transmission of an RRC message or a DCI format for explicitly notifying a UE of the Ap-CSI-RS transmission. As compared with the above-described two methods, the third method allows the UE to implicitly know whether an Ap-CSI-RS has been transmitted, and thus can reduce overhead for transmission of an RRC message or a DCI format.

A first embodiment of the third method is a method using Periodic SRS (P-SRS) transmission. A UE may receive a configured cell-specific SRS transmission subframe through a System Information Block (SIB), and may be assigned a UE-specific SRS transmission subframe through an RRC message. As described above, a case where the UE is assigned the cell-specific SRS transmission subframe and the UE-specific SRS transmission subframe through the SIB and the RRC message, respectively, is referred to as "trigger type 0 SRS transmission", and the UE may transmit a P-SRS in the trigger type 0 SRS transmission. A period of the P-SRS may be determined as 2 to 320 msec.

Figure 4:
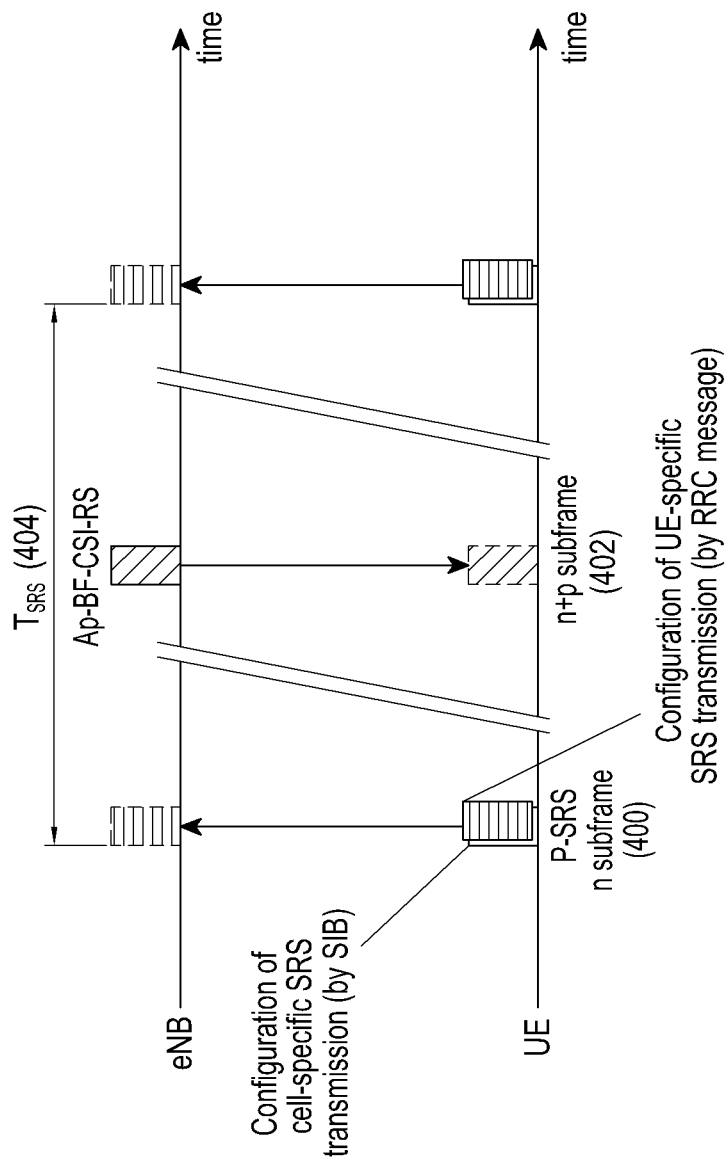
FIG. 4 a diagram illustrating Ap-CSI-RS transmission using a P-SRS.

FIG. 4 illustrates Ap-CSI-RS transmission using a P-SRS.

As illustrated in FIG. 4, a UE may transmit a P-SRS in an n-th subframe 400, and may receive an Ap-CSI-RS in an (n+p) subframe 402. Here, when a period TSRS 404 of the P-SRS is short (e.g., 2 ms), the reliability of a beamforming weight for an Ap-CSI-RS is very large. In contrast, when the period TSRS 404 of the P-SRS is long (e.g., 320 ms), the reliability of a beamforming weight falls due to the time-varying characteristics of a channel, and the long period of the P-SRS may be the cause of degradation of CSI estimated performance. Here, in order to flexibly transmit/receive an Ap-CSI-RS, a value of p is not fixed but has a particular range, and an eNB and the UE may reciprocally know a subframe, in which an Ap-CSI-RS is to be transmitted/received, through configuration of a CSI-RS.

One subframe has two comb types and eight cyclic shift values which are available, and thus allows a maximum of 16 UEs to transmit P-SRSs. However, in view of frequency hopping for a cell boundary UE and a multi-transmission antenna of a UE, the maximum number of UEs available in one subframe may be reduced. Also, in view of 4 Tx SRS transmission which is being considered in Rel-13, SRS capacity becomes smaller. Finally, all of the UEs within a cell transmit P-SRSs having a long period. Accordingly, the scheme for triggering an Ap-CSI-RS by using a P-SRS may not appropriately reflect the characteristics of a time-varying channel Therefore, in the present disclosure, a detailed description will be made of a method for triggering an Ap-CSI-RS by using SRS transmission of a trigger type 1 in which Ap-SRS transmission is configured by an RRC message, and SRS transmission is triggered by an SRS request flag of a DCI format (e.g., a DCI format 0, 4, 1A, 2B, 2C, 2, or the like).

Figure 5:
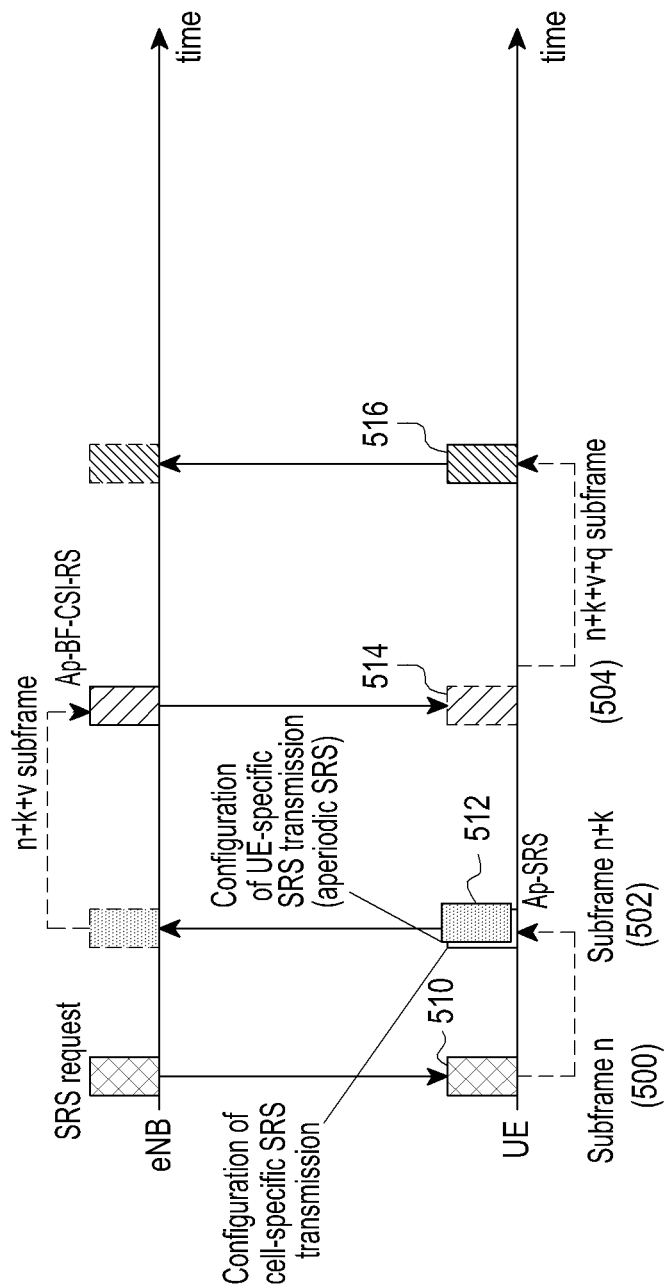
FIG. 5 is a diagram illustrating an example of a method for triggering an Ap-CSI-RS process through one Ap-SRS transmission.

A second embodiment of the third method is a method for performing one Ap-SRS transmission so as to trigger one Ap-CSI-RS process, and is illustrated by example in FIG. 5.

FIG. 5 illustrates an example of a method for triggering an Ap-CSI-RS process (i.e., a process including an Ap-CSI-RS transmission operation and a CSI reporting operation) through one Ap-SRS transmission.

As illustrated in FIG. 5, an SRS request 510 for triggering an Ap-SRS may be triggered by an eNB in a DCI format in an n-th subframe 500. Accordingly, the eNB may implicitly trigger an Ap-CSI-RS (and Ap-CSI-rep) by using the trigger for the Ap-SRS. When a predetermined subframe v elapses from a time point at which a UE transmits an Ap-SRS 512 in an (n+k)-th subframe 502, the UE receives an Ap-CSI-RS 514, and thus does not need to receive a trigger for the Ap-CSI-RS 514. Accordingly, DCI format resources for an Ap-CSI-RS trigger can be saved by the SRS request 510. Also, when a predetermined subframe q elapses from a time point at which the UE receives an Ap-CSI-RS 514 in an (n+k+v)-th subframe 504, the UE may transmit an Ap-CSI-rep 516. Here, a value of v is not fixed but has a predetermined range, and is information that the eNB and the UE may acquire or estimate through a configuration/DCI format.

Figure 6:
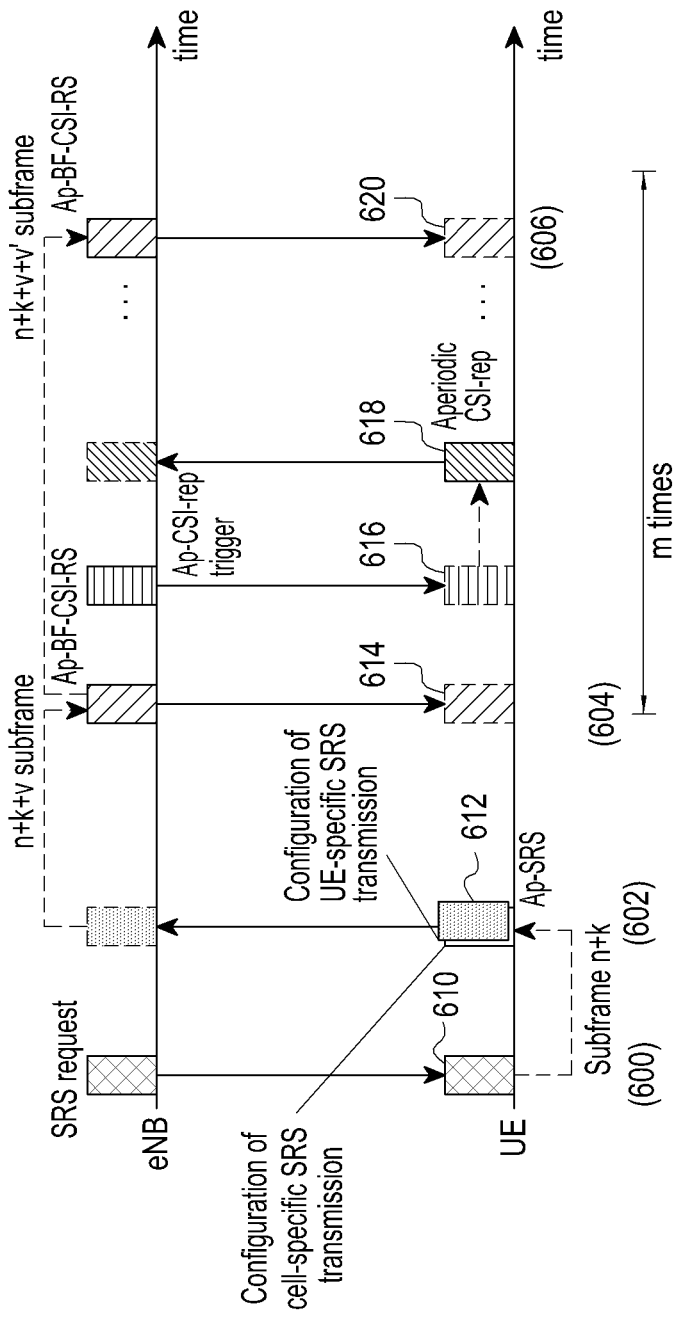
FIG. 6 is a diagram illustrating an example of a method for triggering multiple Ap-CSI-RS transmissions through one Ap-SRS transmission.

A third embodiment of the third method is a method for performing one Ap-SRS transmission so as to trigger multiple Ap-CSI-RS transmissions, and is illustrated by example in FIG. 6.

FIG. 6 illustrates an example of a method for triggering multiple Ap-CSI-RS transmissions through one Ap-SRS transmission.

As illustrated in FIG. 6, an SRS request 610 for triggering an Ap-SRS may be triggered by an eNB in a DCI format in an n-th subframe 600. Accordingly, the eNB may implicitly trigger an Ap-CSI-RS by using the trigger 610 for the Ap-SRS. When a predetermined subframe v elapses (i.e., as indicated by reference numeral 604) from a time point at which a UE transmits an Ap-SRS 612 in an (n+k)-th subframe 602, the UE receives an Ap-CSI-RS 614, and thus does not need to receive a trigger for the Ap-CSI-RS 614. Accordingly, DCI format resources for an Ap-CSI-RS trigger can be saved by the SRS request 610. Also, when a predetermined subframe v' elapses (i.e., as indicated by reference numeral 606) from a time point at which the UE receives the Ap-CSI-RS 614, the UE may receive a second Ap-CSI-RS 620. Accordingly, in the present embodiment, it is possible to define a parameter for the number of times m of the reception of an Ap-CSI-RS by the UE.

The third embodiment of the third method is different from the second embodiment thereof in that the SRS request 610 does not trigger Ap-CSI-rep 618 and the Ap-CSI-rep 618 is triggered by a separate Ap-CSI-rep trigger 616.

Figure 7:
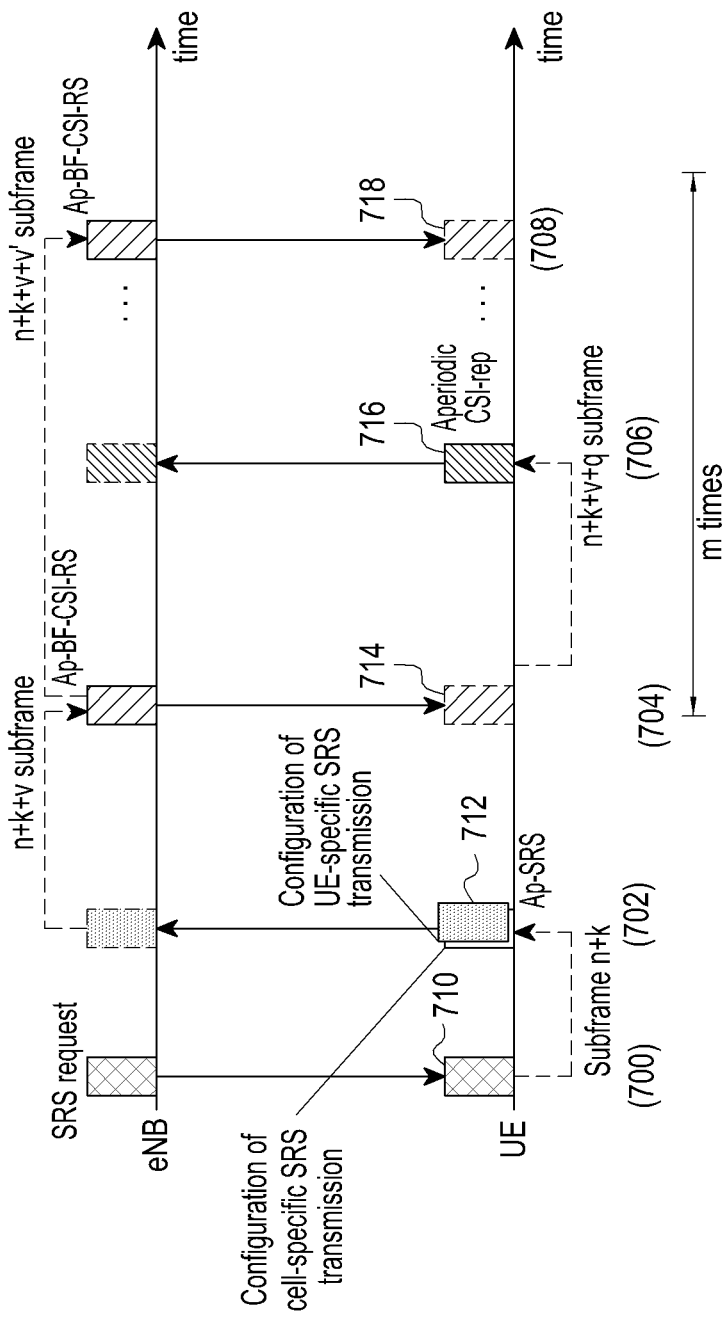
FIG. 7 is a diagram illustrating an example of a method for triggering multiple Ap-CSI-RS processes through one Ap-SRS transmission.

A fourth embodiment of the third method is a method for performing one Ap-SRS transmission so as to trigger multiple Ap-CSI-RS processes, and is illustrated by example in FIG. 7.

FIG. 7 illustrates an example of a method for triggering multiple Ap-CSI-RS processes (i.e., a process including an Ap-CSI-RS transmission operation and a CSI reporting operation) through one Ap-SRS transmission.

As illustrated in FIG. 7, an SRS request 710 for triggering an Ap-SRS may be triggered by an eNB in a DCI format in an n-th subframe 700. Accordingly, the eNB may implicitly trigger an Ap-CSI-RS (and Ap-CSI-rep) by using the trigger for the Ap-SRS. When a predetermined subframe v elapses from a time point at which a UE transmits an Ap-SRS 712 in an (n+k)-th subframe 702, the UE receives an Ap-CSI-RS 714, and thus does not need to receive a trigger for the Ap-CSI-RS 714. Accordingly, DCI format resources for an Ap-CSI-RS trigger can be saved by the SRS request 710. Also, when a predetermined subframe q elapses (i.e., as indicated by reference numeral 706) from a time point at which the UE receives the Ap-CSI-RS 714 in an (n+k+v)-th subframe 704, the UE may transmit Ap-CSI-rep 716. Also, when a predetermined subframe v' elapses (i.e., as indicated by reference numeral 708) from a time point at which the UE receives the Ap-CSI-RS 714, the UE may receive a second Ap-CSI-RS 718. Alternatively, the UE may receive the second Ap-CSI-RS 718, and then may transmit second Ap-CSI-rep. Accordingly, in the present embodiment, it is possible to define a parameter (m) representing the number of times of Ap-CSI-RS transmission to be performed and a parameter (m or another value) indicating the number of times of Ap-CSI-rep execution to be performed.

Figure 8:
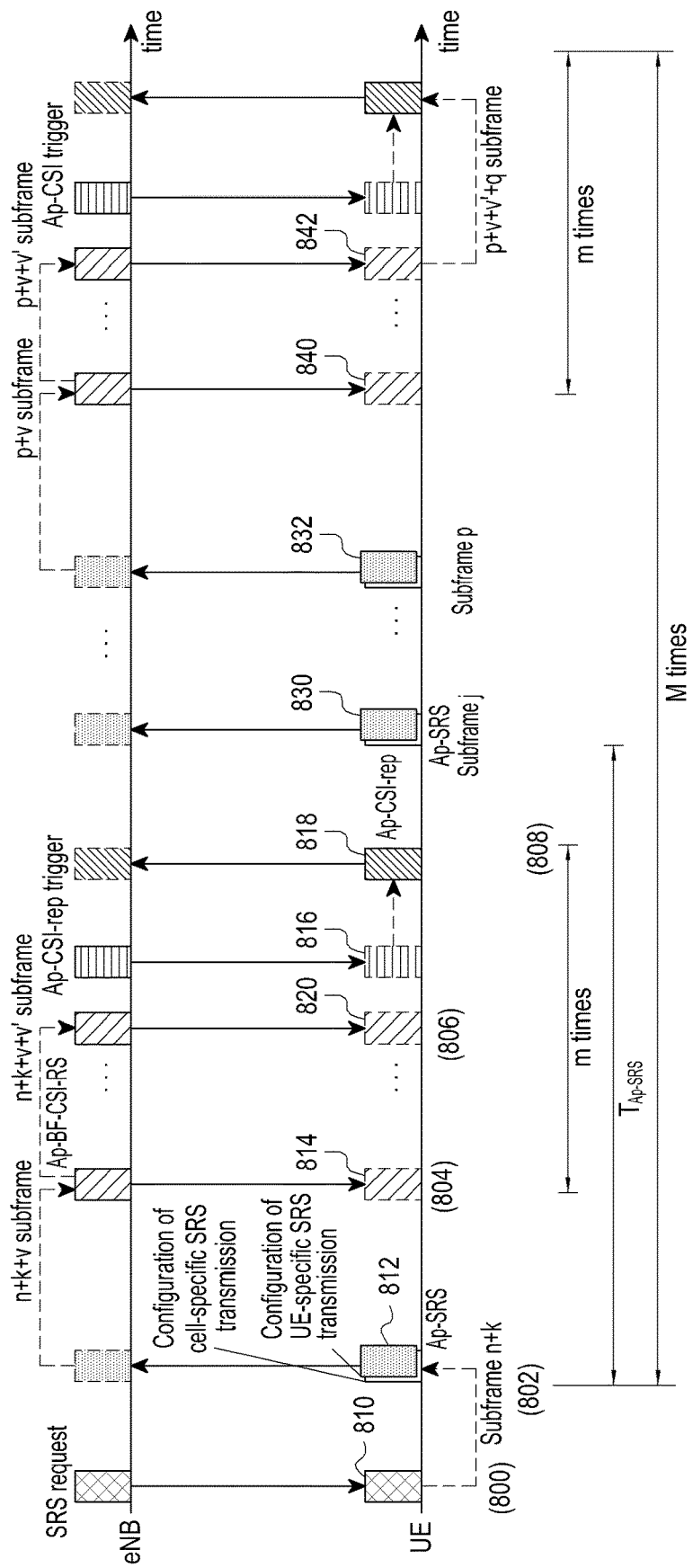
FIG. 8 is a diagram illustrating an example of a method for triggering multiple Ap-CSI-RS transmissions through multiple Ap-SRS transmissions.

A fifth embodiment of the third method for performing multiple Ap-SRS transmissions so as to trigger multiple Ap-CSI-RS transmissions, and is illustrated by example in FIG. 8.

FIG. 8 illustrates an example of a method for triggering multiple Ap-CSI-RS transmissions through multiple Ap-SRS transmissions.

As illustrated in FIG. 8, an SRS request 810 for triggering an Ap-SRS may be triggered by an eNB in a DCI format in an n-th subframe 800. Accordingly, the eNB may implicitly trigger an Ap-CSI-RS by using the trigger 810 for the Ap-SRS. When a predetermined subframe v elapses (i.e., as indicated by reference numeral 804) from a time point at which a UE transmits an Ap-SRS 812 in an (n+k)-th subframe 802, the UE receives an Ap-CSI-RS 814, and thus does not need to receive a trigger for the Ap-CSI-RS 814. Accordingly, DCI format resources for an Ap-CSI-RS trigger can be saved by the SRS request 810. Also, when a predetermined subframe v' elapses (i.e., as indicated by reference numeral 806) from a time point at which the UE receives the Ap-CSI-RS 814, the UE may receive a second Ap-CSI-RS 820. The SRS request 810 does not trigger an Ap-CSI-RS 818, and the Ap-CSI-RS 818 is triggered by a separate Ap-CSI-rep trigger 816. Also, after the elapse of a predetermined time interval TAp-SRS from a transmission point of the Ap-SRS 812, additional Ap-SRSs 830 and 832 may be transmitted, and multiple Ap-CSI-RS transmissions 840 and 842, which follow the additional Ap-SRS 832, may be performed.

Accordingly, in the present embodiment, it is possible to define a parameter M indicating the number of times of Ap-SRS transmission to be performed through the trigger (i.e., as indicated by reference numeral 810) transmitted in a DCI format at a time, and a parameter m indicating the number of times of Ap-CSI-RS transmission to be performed through the trigger transmitted in a DCI format at a time.

Figure 9:
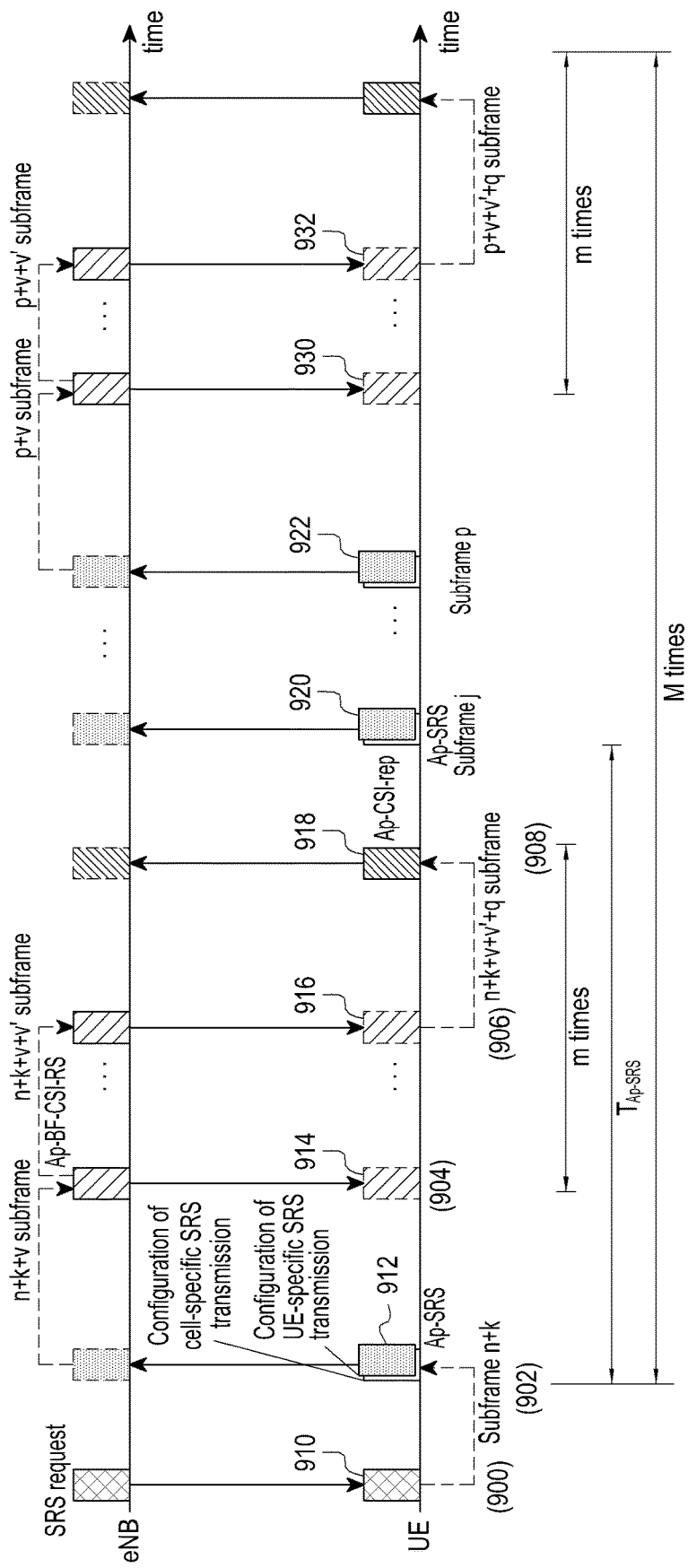
FIG. 9 is a diagram illustrating an example of a method for triggering multiple Ap-CSI-RS processes through multiple Ap-SRS transmissions.

A sixth embodiment of the third method is a method for performing multiple Ap-SRS transmissions so as to trigger multiple Ap-CSI-RS processes, and is illustrated by example in FIG. 9.

FIG. 9 illustrates an example of a method for triggering multiple Ap-CSI-RS processes (i.e., a process including an Ap-CSI-RS transmission operation and CSI reporting operation) through multiple Ap-SRS transmissions.

As illustrated in FIG. 9, an SRS request 910 for triggering an Ap-SRS may be triggered by an eNB in a DCI format in an n-th subframe 900. Accordingly, the eNB may implicitly trigger an Ap-CSI-RS (and Ap-CSI-rep) by using the trigger for the Ap-SRS. When a predetermined subframe v elapses from a time point at which a UE transmits an Ap-SRS 912 in an (n+k)-th subframe 902, the UE receives an Ap-CSI-RS 914, and thus does not need to receive a trigger for the Ap-CSI-RS 914. Accordingly, DCI format resources for an Ap-CSI-RS trigger can be saved by the SRS request 910. Also, when a predetermined subframe v' elapses (i.e., as indicated by reference numeral 906) from a time point at which the UE receives the Ap-CSI-RS 914 in an (n+k+v)-th subframe 904, the UE may receive a second Ap-CSI-RS 916. When a predetermined subframe q elapses (i.e., as indicated by reference numeral 908) from a time point at which the UE receives the second Ap-CSI-RS 916, the UE may transmit Ap-CSI-rep 918. Also, after the elapse of a predetermined time interval TAp-SRS from a transmission time point of the Ap-SRS 912, additional Ap-SRSs 920 and 922 may be transmitted, and multiple Ap-CSI-RS transmissions 930 and 932, which follow the additional Ap-SRS 922, may be performed.

Accordingly, in the present embodiment, it is possible to define a parameter M indicating the number of times of Ap-SRS transmission to be performed through the trigger (i.e., as indicated by reference numeral 910) transmitted in a DCI format at a time, a parameter m indicating the number of times of Ap-CSI-RS transmission to be performed through the trigger transmitted in a DCI format at a time, and a parameter indicating the number of times of Ap-CSI-rep execution to be performed through the trigger transmitted in a DCI format at a time.

The above-described explicit triggering method and implicit triggering method may be applied together. For example, even when the explicit triggering method is used, triggering of an Ap-CSI-RS may be applied by SRS configuration or SRS triggering information.

Also, the above-described embodiments of the third method may be classified into embodiments (the second, fourth, and sixth embodiments) in which an SRS trigger (i.e., an SRS request) triggers an Ap-CSI-RS process, and embodiments (the third and fifth embodiments) in which an SRS trigger (i.e., an SRS request) triggers Ap-CSI-RS transmission. Accordingly, the SRS request transmitted through a DCI format may include information indicating whether the SRS request triggers an Ap-CSI-RS process or triggers Ap-CSI-RS transmission.

Figure 10:
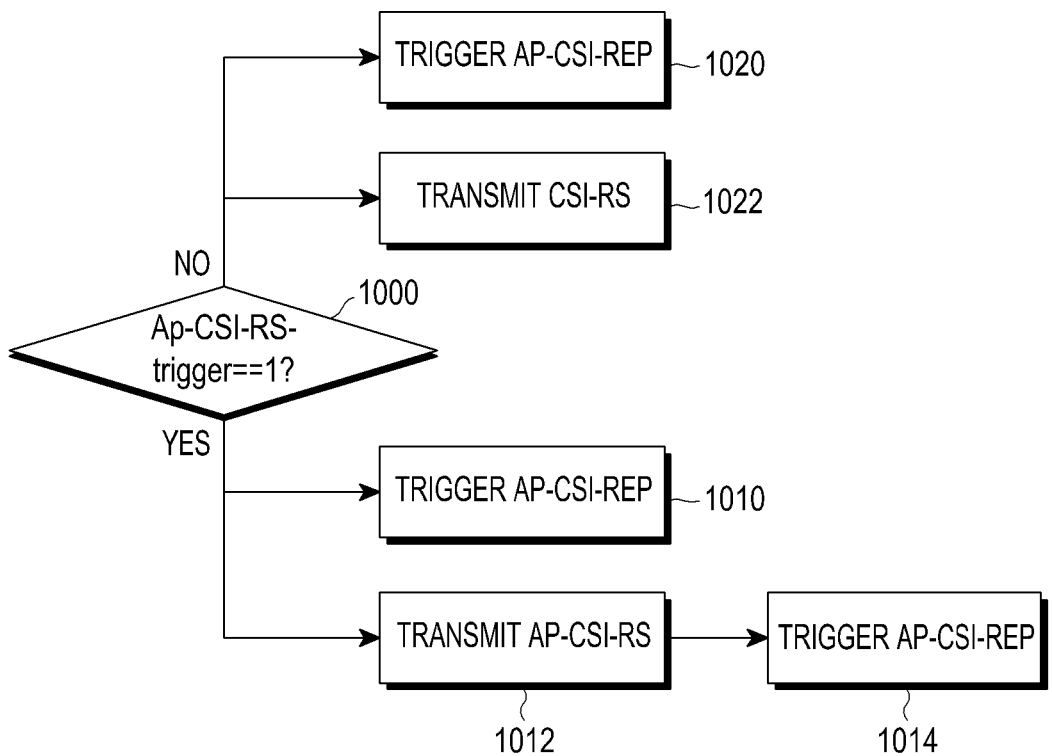
FIG. 10 is a view illustrating an example of an operation of a base station in a case where trigger information of an Ap-CSI-RS is transmitted to a UE through a DCI format.

FIG. 10 is a view illustrating an example of an operation of a BS that transmits trigger information of an Ap-CSI-RS through a DCI format.

In operation 1000, the BS determines (Ap-CSI-RS trigger==1) whether Ap-CSI-RS trigger information is loaded into a DCI format and the Ap-CSI-RS trigger information loaded in the DCI format is transmitted to a UE. When the Ap-CSI-RS trigger information is transmitted in a state of being loaded in the DCI format, the BS may transmit an Ap-CSI-RS in operation 1012, and may trigger Ap-CSI-rep of the UE in operation 1014

However, in operation 1010, the BS may trigger Ap-CSI-rep from the UE regardless of the transmission of an Ap-CSI-RS. That is, triggering of Ap-CSI-rep for receiving a report on an Ap-CSI-RS may be performed together with the transmission of an Ap-CSI-RS in operation 1014, or may be independently performed in operation 1010. Meanwhile, when the BS does not transmit a trigger for an Ap-CSI-RS to the UE (Ap-CSI-RS trigger!=1), the BS may transmit a (periodic) CSI-RS in operation 1022, or may trigger Ap-CSI-rep in operation 1020.

Figure 11:
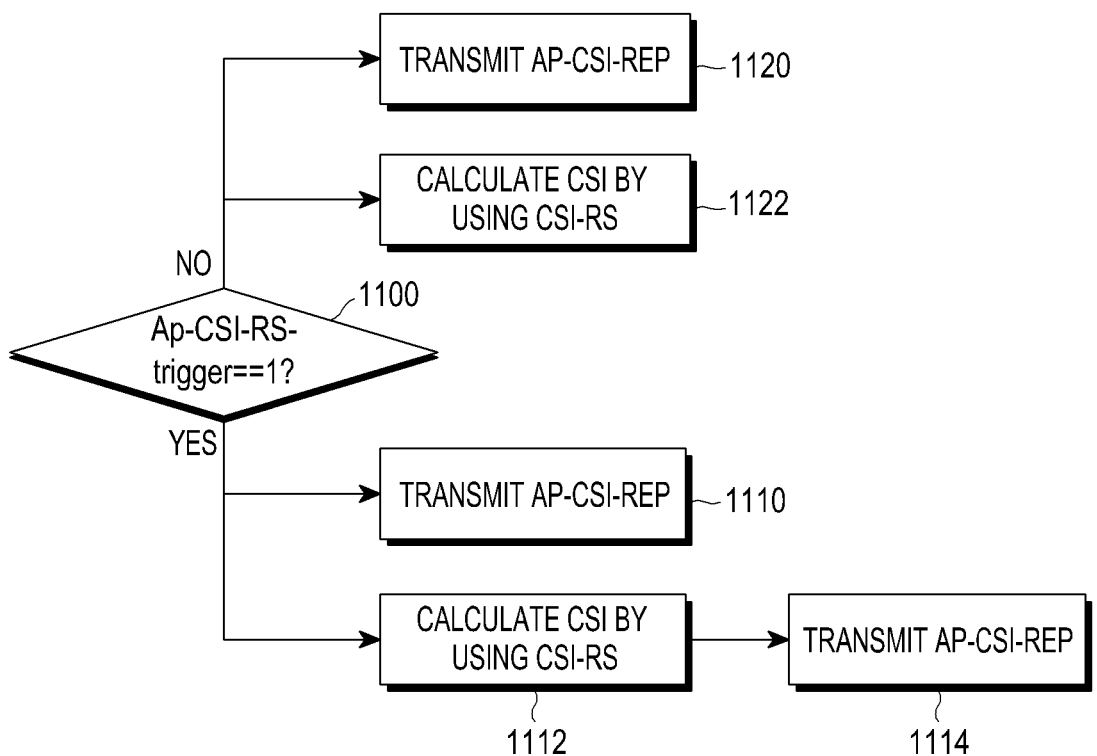
FIG. 11 is a view illustrating an example of an operation of a UE in a case where trigger information of an Ap-CSI-RS is transmitted to the UE through a DCI format.

FIG. 11 is a view illustrating an example of an operation of a UE that receives trigger information of an Ap-CSI-RS through a DCI format.

In operation 1100, the UE detects a DCI format, and determines whether the received DCI format includes Ap-CSI-RS trigger information (Ap-CSI-RS trigger=1). When the received DCI format includes the Ap-CSI-RS trigger information, in operation 1112, the UE calculates CSI by using an Ap-CSI-RS. The Ap-CSI-rep that the UE has measured using an Ap-CSI-RS may be performed independently of the calculation of the CSI in operation 1112 as indicated by reference numeral 1110. Alternatively, the Ap-CSI-rep may be performed in a pair with the calculation of the CSI in operation 1112 as indicated by reference numeral 1114. Meanwhile, when the UE does not detect an Ap-CSI-RS trigger from the DCI format (Ap-CSI-RS trigger!=1), the UE may calculate CSI by using a (periodic) CSI-RS in operation 1122, or may perform Ap-CSI-rep in operation 1120.

Figure 12:
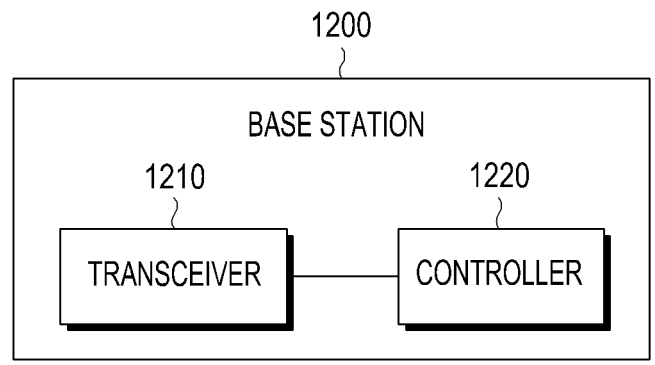
FIG. 12 is a diagram illustrating an example of a configuration of an apparatus of a base station according to an embodiment of the present disclosure.

FIG. 12 is a diagram illustrating an example of a configuration of an apparatus of a BS according to an embodiment of the present disclosure.

The apparatus of the BS 1200 may include a transmitter/receiver 1210 that transmits/receives a signal or data to/from a UE, and a controller 1220 that controls the transmitter/receiver 1210 to allow the UE to perform the operations described in embodiments of the present disclosure.

In embodiments of the present disclosure, the above-described all operations of the BS can be understood to be performed under the control of the controller 1220. However, it goes without saying that the controller 1220 and a transmitter/receiver 1210 do not need to be necessarily implemented as separate elements and thus may be implemented as one constituent unit (in the form of a single chip).

Figure 13:
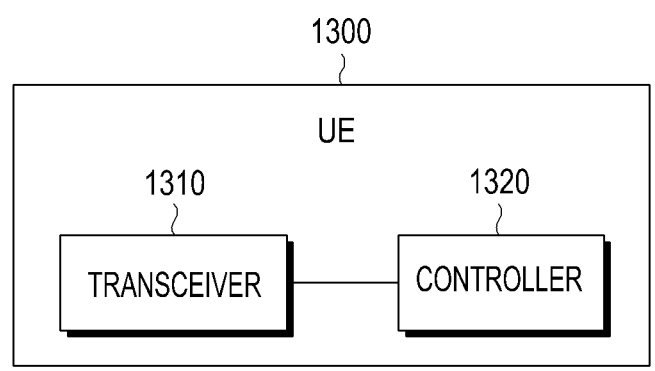
FIG. 13 is a diagram illustrating an example of a configuration of a UE apparatus according to an embodiment of the present disclosure.

FIG. 13 is a diagram illustrating an example of a configuration of a UE apparatus according to an embodiment of the present disclosure.

The UE apparatus 1300 may include a transmitter/receiver 1310 that transmits/receives a signal or data to/from a BS, and a controller 1320 that controls the transmitter/receiver 1310 to allow the UE to perform the operations described in embodiments of the present disclosure.

In embodiments of the present disclosure, the above-described all operations of the UE can be understood to be performed under the control of the controller 1320. However, it goes without saying that the controller 1320 and a transmitter/receiver 1310 do not need to be necessarily implemented as separate elements and thus may be implemented as one constituent unit (in the form of a single chip).

It should be noted that the illustrative views of transmission resources, the signal flow diagrams, the system configuration views, the apparatus configuration views, and the like, illustrated by example in FIGS. 2 to 13, do not limit the scope of the present disclosure. That is, all the signals, all the constituent units, or all the steps of the operations, illustrated in FIGS. 2 to 12, should not be construed to be essential elements for practice of the present disclosure, and even when only some elements thereof are included, the some elements thereof may implement the present disclosure without departing from the essence of the present disclosure.

The above-described operations may be implemented by providing a memory device storing a corresponding program code to the entity of the communication system, the function, the BS, or a specific structural unit of the UE. That is, the entity, the function, or the controller of the BS or UE may perform the above-described operations by reading and executing the program code stored in the memory device by means of a processor or a Central Processing Unit (CPU).

The entity, the function, the BS, the load manager, various constituent units of the UE, modules, and the like, described in the present specification, may be operated by using a hardware circuit, for example, a complementary metal oxide semiconductor-based logic circuit, firmware, software, and/or a combination of hardware, firmware and/or software embedded in a machine-readable medium. As an example, various electric configurations and methods may be practiced by using electric circuits such as transistors, logic gates, and an application-specific integrated circuit (ASIC).

Meanwhile, while the present disclosure has been shown and described with reference to certain embodiments thereof, it goes without saying that various changes in form and details may be made therein without departing from the scope of the present disclosure. Therefore, the scope of the present disclosure should not be limited to the described embodiments but should be defined by the appended claims and equivalents thereof.

The invention claimed is:

1. A method of a base station for performing communication based on a channel state information reference signal (CSI-RS) in a mobile communication system, the method comprising:
   receiving periodically a sounding reference signal (SRS) from a user equipment;
   selecting a precoding matrix based on the received SRS;
   transmitting a CSI-RS based on the selected precoding matrix;
   receiving channel state information (CSI) reporting from the user equipment;
   determining a transmission parameter based on the CSI reporting; and
   transmitting data to the user equipment based on the determined transmission parameter,
   wherein the CSI-RS corresponds to an aperiodic CSI-RS, and
   wherein the transmitting of the CSI-RS is scheduled to a predetermined number of subframes after the receiving of the periodically-received SRS.

2. The method of claim 1, wherein the CSI-RS corresponds to a beamformed CSI-RS.

3. The method of claim 1, further comprising one of:
   transmitting a radio resource control (RRC) message for configuring the transmitting of the aperiodic CSI-RS; and
   transmitting information for configuring the transmitting of the aperiodic CSI-RS through a downlink control information (DCI).

4. The method of claim 3, wherein the DCI corresponds to a DCI format 0 or a DCI format 4, and the information for configuring the transmitting of the aperiodic CSI-RS is transmitted through an aperiodic CSI reporting field of the DCI format 0 or the DCI format 4.

5. The method of claim 3, wherein the DCI corresponds to a DCI format 1, a DCI format 1A, a DCI format 2, a DCI format 2A, or a DCI format 2B.

6. The method of claim 3, wherein the DCI further comprises at least one of a number of CSI-RS ports, CSI-RS transmission subframe information, a number of times of CSI-RS transmission, or CSI-RS transmission resource element (RE) position information.

7. The method of claim 1, further comprising:
   transmitting, through DCI, information for triggering at least one transmission of the SRS,
   wherein the information for triggering the transmission of the SRS comprises information for configuring the transmitting of the aperiodic CSI-RS.

8. The method of claim 7, wherein the information for triggering the at least one transmission of the SRS triggers at least one CSI reporting which is based on the aperiodic CSI-RS.

9. The method of claim 7, wherein the information for triggering the at least one transmission of the SRS further comprises at least one of:
   a number of times of the transmission of the SRS, a number of times of the transmission of the aperiodic CSI-RS, or a number of times of the CSI reporting.

10. A method of a user equipment for performing communication based on a channel state information reference signal (CSI-RS) in a mobile communication system, the method comprising:
    transmitting periodically a sounding reference signal (SRS) to a base station;
    receiving a CSI-RS based on a precoding matrix selected by the base station;
    calculating CSI based on the received CSI-RS;
    transmitting, to the base station, CSI reporting including the calculated CSI; and
    receiving data from the base station,
    wherein the CSI-RS corresponds to an aperiodic CSI-RS, and
    wherein the receiving of the CSI-RS is scheduled to a predetermined number of subframes after the transmitting of the periodically-transmitted SRS.

11. The method of claim 10, further comprising receiving a radio resource control (RRC) message for configuring the receiving of the aperiodic CSI-RS.

12. The method of claim 10, further comprising receiving, through downlink control information (DCI), information for configuring the receiving of the aperiodic CSI-RS.

13. The method of claim 12, wherein the DCI further comprises at least one of a number of CSI-RS ports, CSI-RS transmission subframe information, a number of times of CSI-RS transmission, or CSI-RS transmission resource element (RE) position information.

14. The method of claim 10, further comprising:
    receiving, through downlink control information (DCI), information for triggering at least one transmission of the SRS,
    wherein the information for triggering the at least one transmission of the SRS comprises information for configuring the receiving of the aperiodic CSI-RS.

15. The method of claim 14, wherein the information for triggering the at least one transmission of the SRS triggers at least one CSI reporting which is based on the aperiodic CSI-RS.

16. The method of claim 14, wherein the information for triggering the at least one transmission of the SRS further comprises at least one of:
    a number of times of the transmission of the SRS, a number of times of the transmission of the aperiodic CSI-RS, or a number of times of the CSI reporting.

17. A base station using a channel state information reference signal (CSI-RS) in a mobile communication system, the base station comprising:
    a transceiver; and
    at least one processor coupled to the transceiver and configured to:
    receive periodically a sounding reference signal (SRS) from a user equipment,
    select a precoding matrix based on the received SRS, transmit the CSI-RS based on the selected precoding matrix,
receive channel state information (CSI) reporting from the user equipment,
determine a transmission parameter based on the CSI reporting, and
transmit data to the user equipment based on the determined transmission parameter,
wherein the CSI-RS corresponds to an aperiodic CSI-RS, and
wherein the transmitting of the CSI-RS is scheduled to a predetermined number of subframes after the receiving of the periodically-received SRS.

18. A user equipment using a channel state information reference signal (CSI-RS) in a mobile communication system, the user equipment comprising:
a transceiver; and
at least one processor coupled to the transceiver and configured to:
transmit periodically a sounding reference signal (SRS) to a base station,
receive the CSI-RS based on a precoding matrix selected by the base station,
calculate CSI based on the received CSI-RS,
transmit CSI reporting including the calculated CSI to the base station, and
receive data from the base station,
wherein the CSI-RS corresponds to an aperiodic CSI-RS, and
wherein the receiving of the CSI-RS is scheduled to a predetermined number of subframes after the transmitting of the periodically-transmitted SRS.

* * * * *